(No Model.)
C. WENDEL & H. WEGNER.
TIRE TIGHTENER.
No. 460,275. Patented Sept. 29, 1891.
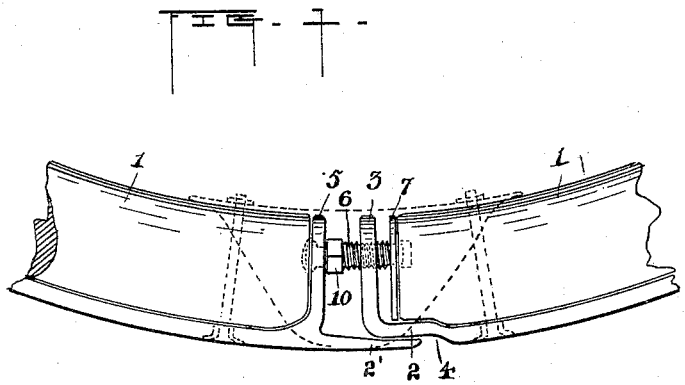
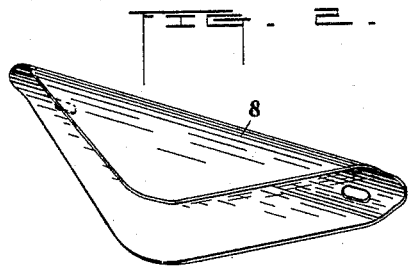
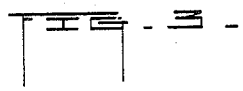
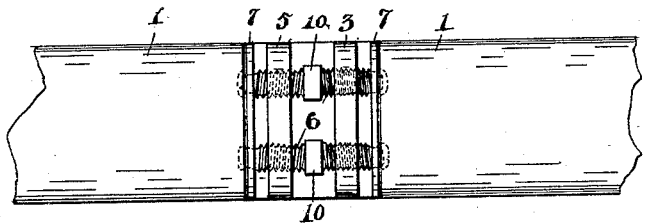
WITNESSES
Arch. M. Catlin.
Steve. Voyles.
INVENTORS
Carl Wendel
Herman Wegner
by Benj. R. Catlin Atty

UNITED STATES PATENT OFFICE.

CARL WENDEL AND HERMAN WEGNER, OF GROTON, SOUTH DAKOTA.

TIRE-TIGHTENER.

SPECIFICATION forming part of Letters Patent No. 460,275, dated September 29, 1891.

Application filed June 29, 1891. Serial No. 397,884. (No model.)

*To all whom it may concern:*

Be it known that we, CARL WENDEL and HERMAN WEGNER, residents of Groton, in the county of Brown and State of South Dakota, have invented certain new and useful Improvements in Tire-Tighteners; and we do hereby declare the following to be a full, clear, and exact description of the invention, such as will enable others skilled in the art to which it pertains to make and use the same.

The object of the invention is to provide a wheel-tire that can be set and reset and thereby adjusted in dimensions to any desired extent without a fire by any person of ordinary skill by the use of a wrench, and is an improvement upon that class of wheels in which the tire is adjustable; and the invention consists in the construction hereinafter described and pointed out.

In the accompanying drawings, Figure 1 is a side elevation of a section of a wheel rim and tire, showing our improvement, a clip or sleeve being shown in dotted lines. Fig. 2 is a perspective view of the clip or sleeve. Fig. 3 is a view of a modification.

Numeral 1 denotes sections of a wheel-rim, and 2 2 the overlapping ends of the tire. The tire may, if desired, be bolted upon the rim, in which the bolt-holes should be made oblong to provide for the contraction of the tire upon the fellies or rim. The end of the tire at 3 is bent transversely to the general direction of the same at its adjacent end, and it has also a depression 4, suitable for the reception of the other end of the tire. The rim of the wheel is cut away, as shown, to provide a seat for this depressed part. The opposite end of the tire 2' is provided with a flange 5. Both flanges 3 and 5 have openings adapted to receive a screw 6. This screw has a head fitted to a countersunk hole in the rear of flange 5. Its opposite end is screwed through a suitable opening in flange 3 and partly through and against a washer 7 and into an opening in the wheel-rim. The screw is provided with an angular portion 10, suitable for the application of a wrench.

8 denotes a covering sleeve or clip provided with bolt-holes for securing the same to the rim and tire, and 9 are the bolts. The holes are made oblong to provide for the movement of the tire when tightened. This cover protects the joint in the wheel-rim from meddlers and excludes dirt.

The devices thus far described are suitable for light wheels. In the case of heavy wheels two or more screw-bolts 6 may be used, and preferably these will be provided with right and left hand screws at their opposite ends, as shown in Fig. 3. In case one or more of such bolts are used the openings in both flanges 3 and 5 will be screw-threaded, and openings will be provided in both ends of the rim, and two washers, one next to each end of the rim, may be employed. These washers receive the thrust of the screw-bolts.

By the improved tire fastener and tightener herein set forth a tire can be promptly tightened by any person without danger of dishing the wheel and without the delay and expense of sending the same to the shop.

In devices heretofore proposed, in which the tire was cut and the ends made movable upon each other, separate coupling-pieces have been bolted to the tire and fellies and between them in such manner that one end of the tire acted as a wedge between the other end and its coupling-piece. In such device the coupling-pieces overlapped as well as the tire, and the adjustment or construction of the tire was limited by said couplings. By the present improvement the coupling-pieces are dispensed with, one end of the tire being simply turned down to form a flange or shoulder and the other being provided with a corresponding flange sufficiently remote from its end to permit any desired amount of contraction or adjustment. Our construction is simpler than any known to us and is free from the objection above noted—namely, that one end of the tire is liable to be wedged between the other end and its coupling-piece.

Having thus described our invention, what we desire to secure by Letters Patent is—

1. The wheel having a rim and provided with a tire having one end bent at an angle thereto to form a lug, said lug being provided with a bolt-opening, said tire having its other and overlapping end provided with a similar apertured lug back of its overlapping part, and a screw-bolt engaging said lugs, said first-named tire end having a depression back of its lug adapted to receive the overlapping end of the tire, substantially as set forth.

2. The wheel having a rim and provided with a tire having one end bent at an angle thereto to form a lug, said lug being provided with a bolt-opening, said tire having its other and overlapping end provided with a similar apertured lug back of its overlapping part, and a screw-bolt engaging said lugs, and a washer interposed between said second lug and the wheel-rim, said first-named tire end having a depression back of its lug adapted to receive the overlapping end of the tire, substantially as set forth.

3. The wheel having a rim and provided with a tire having one end bent at an angle thereto to form a lug, said lug being provided with a bolt-opening, said tire having its other overlapping end provided with a similar apertured lug back of its overlapping part, and a screw-bolt engaging said lugs, and a washer interposed between said second lug and the wheel-rim, said first-named tire end having a depression back of its lug adapted to receive the overlapping end of the tire, and the wheel-rim having openings adapted to receive the ends of the adjusting-bolt, substantially as set forth.

4. The wheel having overlapping tire, the ends being made movable one upon the other, the rim, the adjusting-bolt engaging lugs on the tire, the clip over the lugs, and adjusting-bolt, said tire and clip having oblong bolt-holes and provided with bolts passing through tire, rim, and clip and fitting openings in the rim, where the ends of the tire and the clip are permitted to move on the rim, substantially as set forth.

In testimony whereof we have signed this specification in the presence of two subscribing witnesses.

CARL WENDEL.
HERMAN WEGNER.

Witnesses:
W. I. ERWIN,
W. B. MILLER.